April 27, 1948.　　　　T. C. GRAY　　　　2,440,259
CAM ACTUATED VALVE MECHANISM FOR FLUID PRESSURE ENGINES
Filed March 9, 1945　　　14 Sheets-Sheet 1

Inventor
THOMAS C. GRAY

By Ralph L. Chappell
Attorney

April 27, 1948. T. C. GRAY 2,440,259
CAM ACTUATED VALVE MECHANISM FOR FLUID PRESSURE ENGINES
Filed March 9, 1945 14 Sheets-Sheet 3

Inventor
Thomas C. Gray.

By Ralph L. Chappell
Attorney

April 27, 1948.　　　　　T. C. GRAY　　　　　2,440,259
CAM ACTUATED VALVE MECHANISM FOR FLUID PRESSURE ENGINES
Filed March 9, 1945　　　14 Sheets-Sheet 4

Inventor
Thomas C. Gray.

By Ralph L. Chappell
Attorney

April 27, 1948. T. C. GRAY 2,440,259
CAM ACTUATED VALVE MECHANISM FOR FLUID PRESSURE ENGINES
Filed March 9, 1945 14 Sheets-Sheet 5

Inventor
Thomas C. Gray.

By Ralph L. Chappell
Attorney

Inventor.
Thomas C. Gray.
By Ralph L. Chappell
Attorney

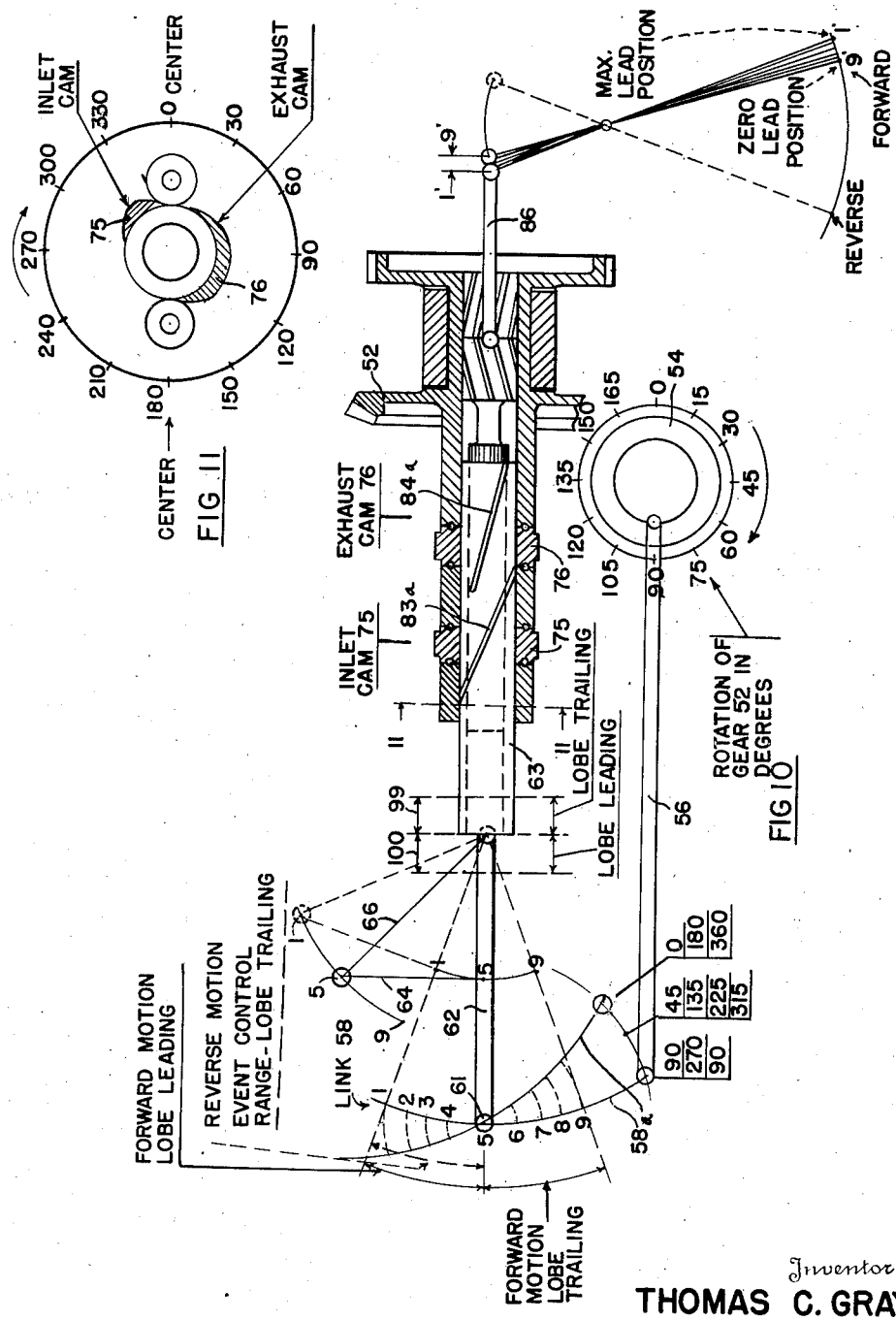

April 27, 1948.　　　T. C. GRAY　　　2,440,259
CAM ACTUATED VALVE MECHANISM FOR FLUID PRESSURE ENGINES
Filed March 9, 1945　　　14 Sheets—Sheet 8.

Inventor
THOMAS C. GRAY
By Ralph L. Chappell
Attorney

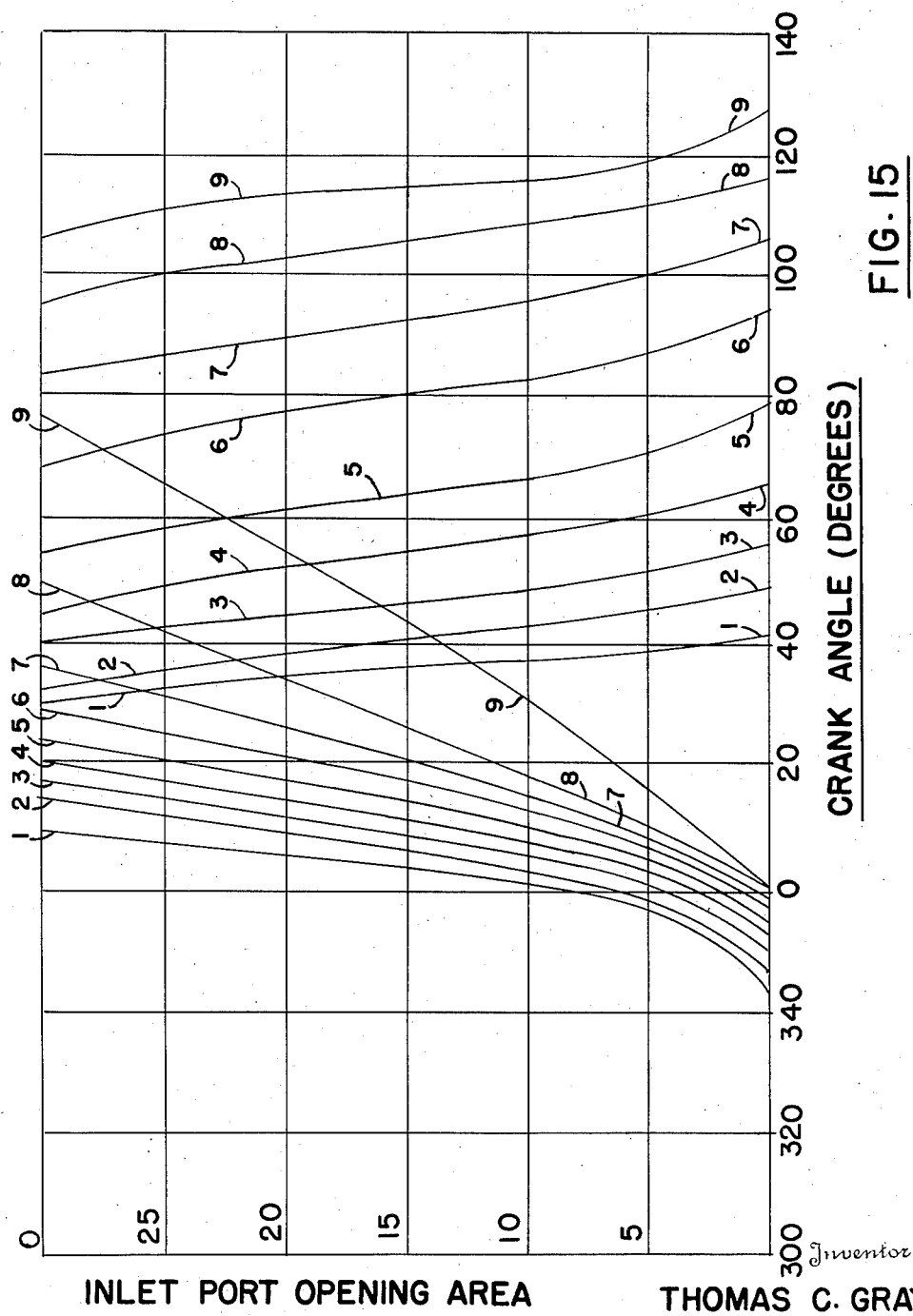

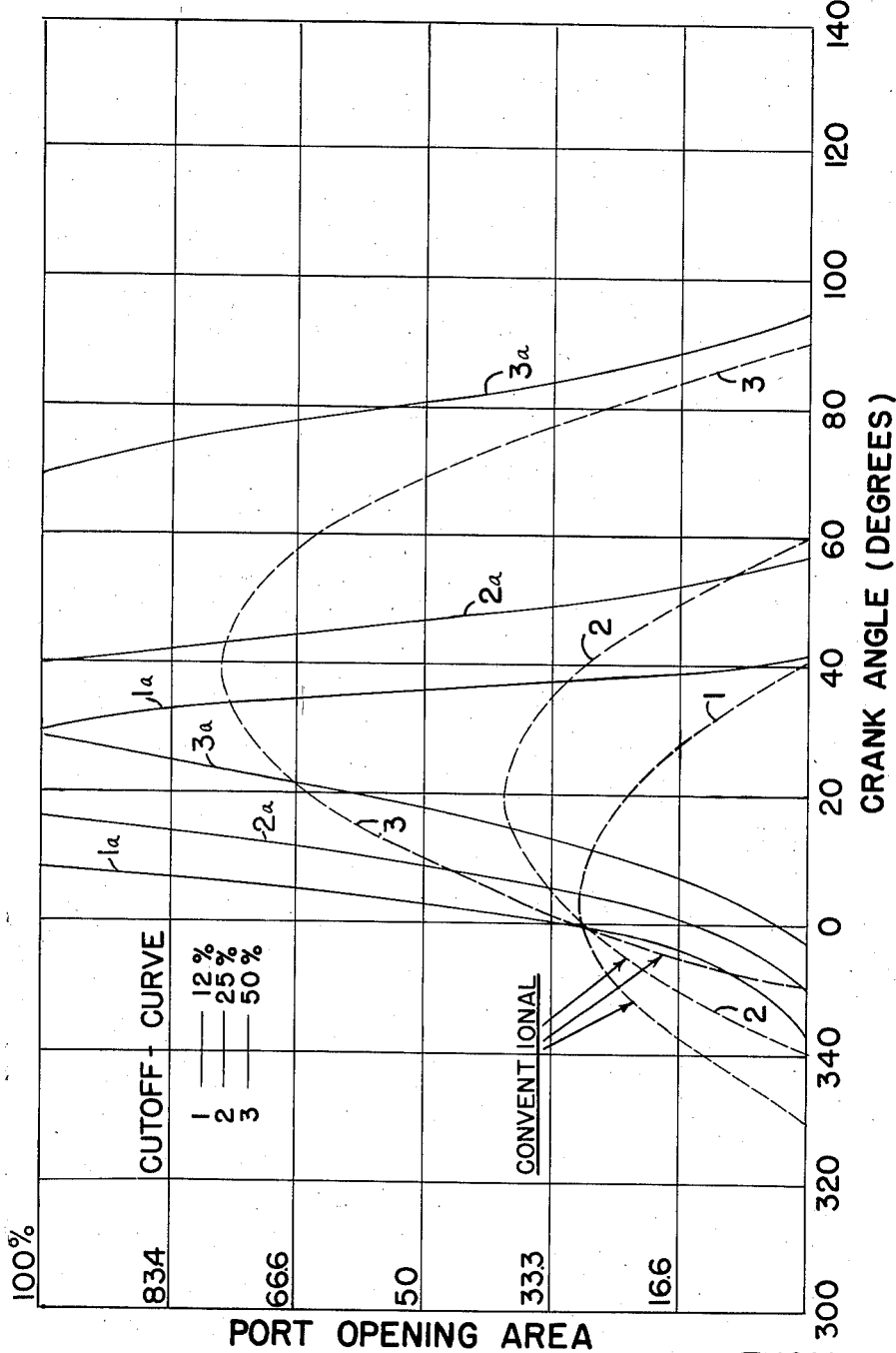

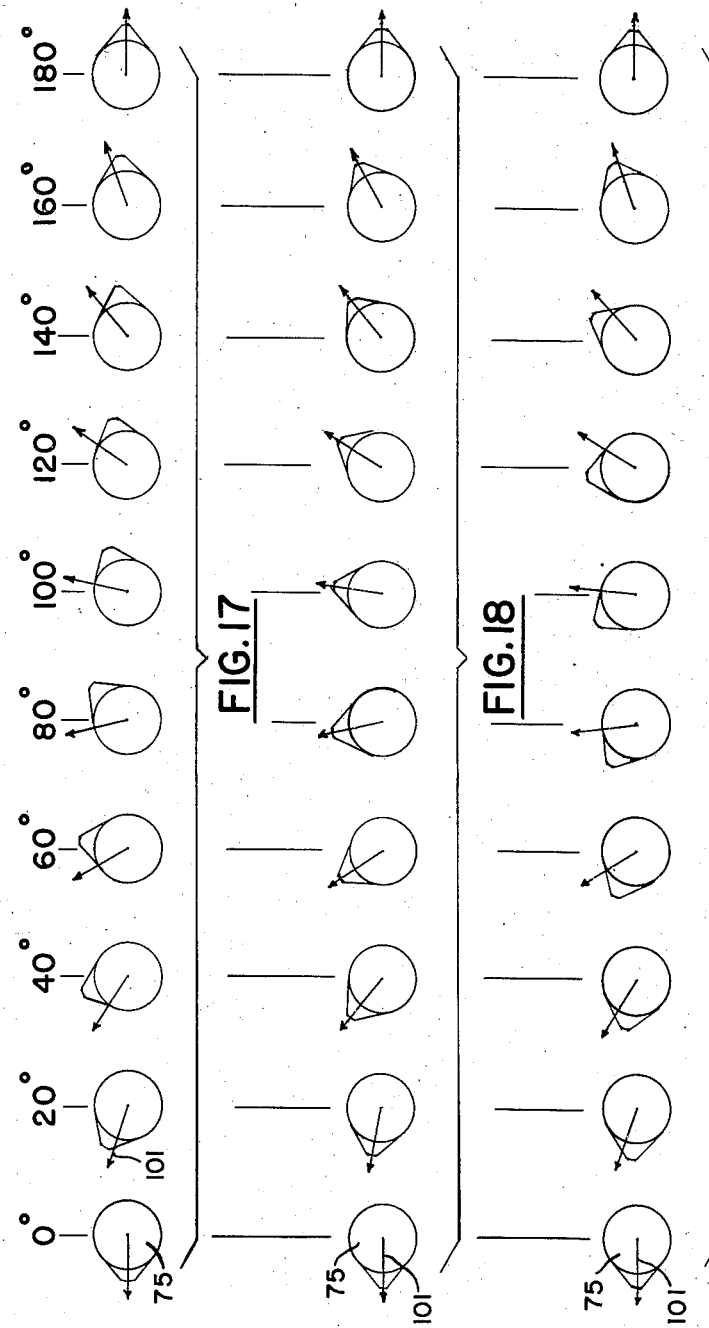

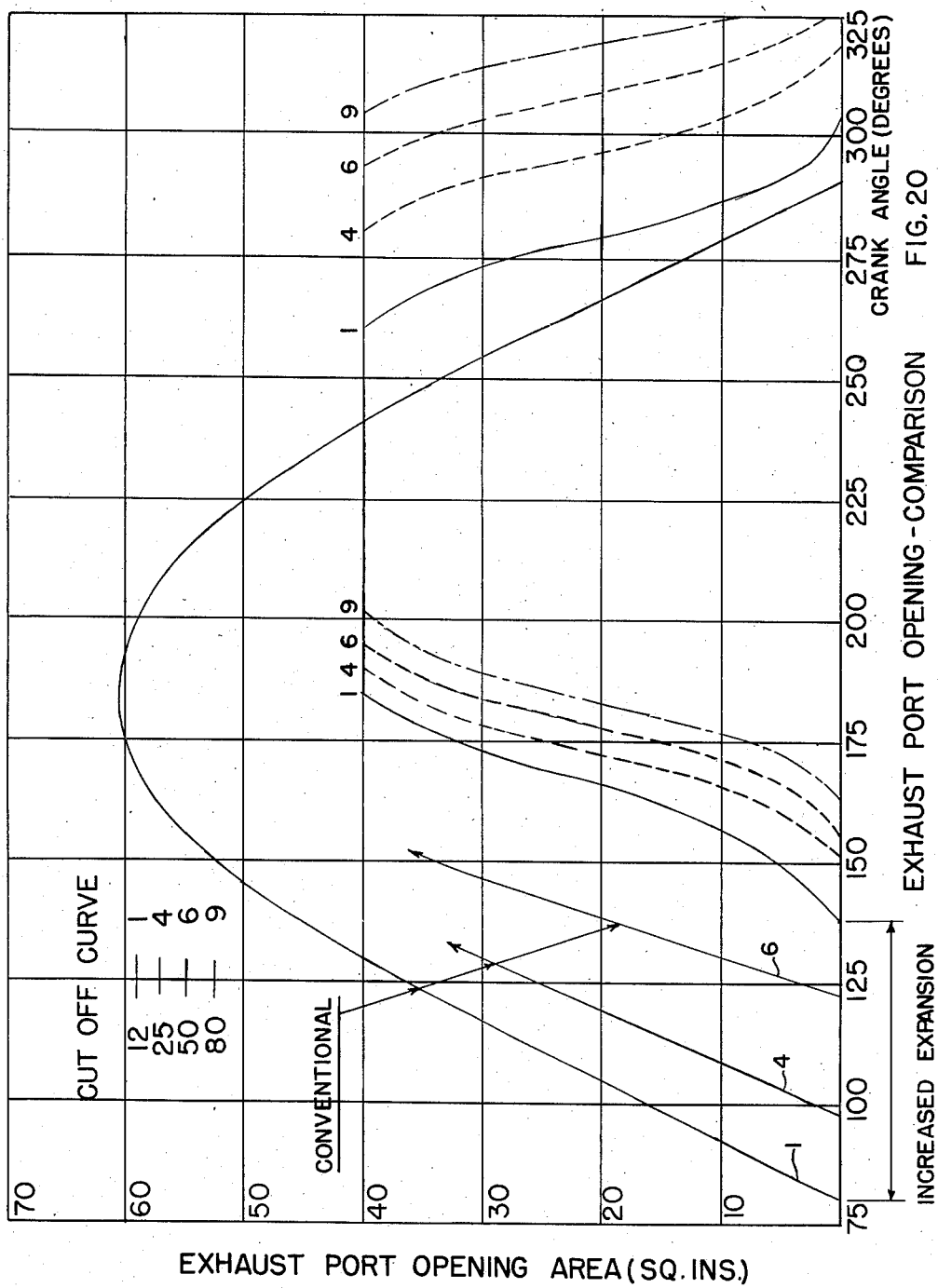

April 27, 1948. T. C. GRAY 2,440,259
CAM ACTUATED VALVE MECHANISM FOR FLUID PRESSURE ENGINES
Filed March 9, 1945 14 Sheets-Sheet 14
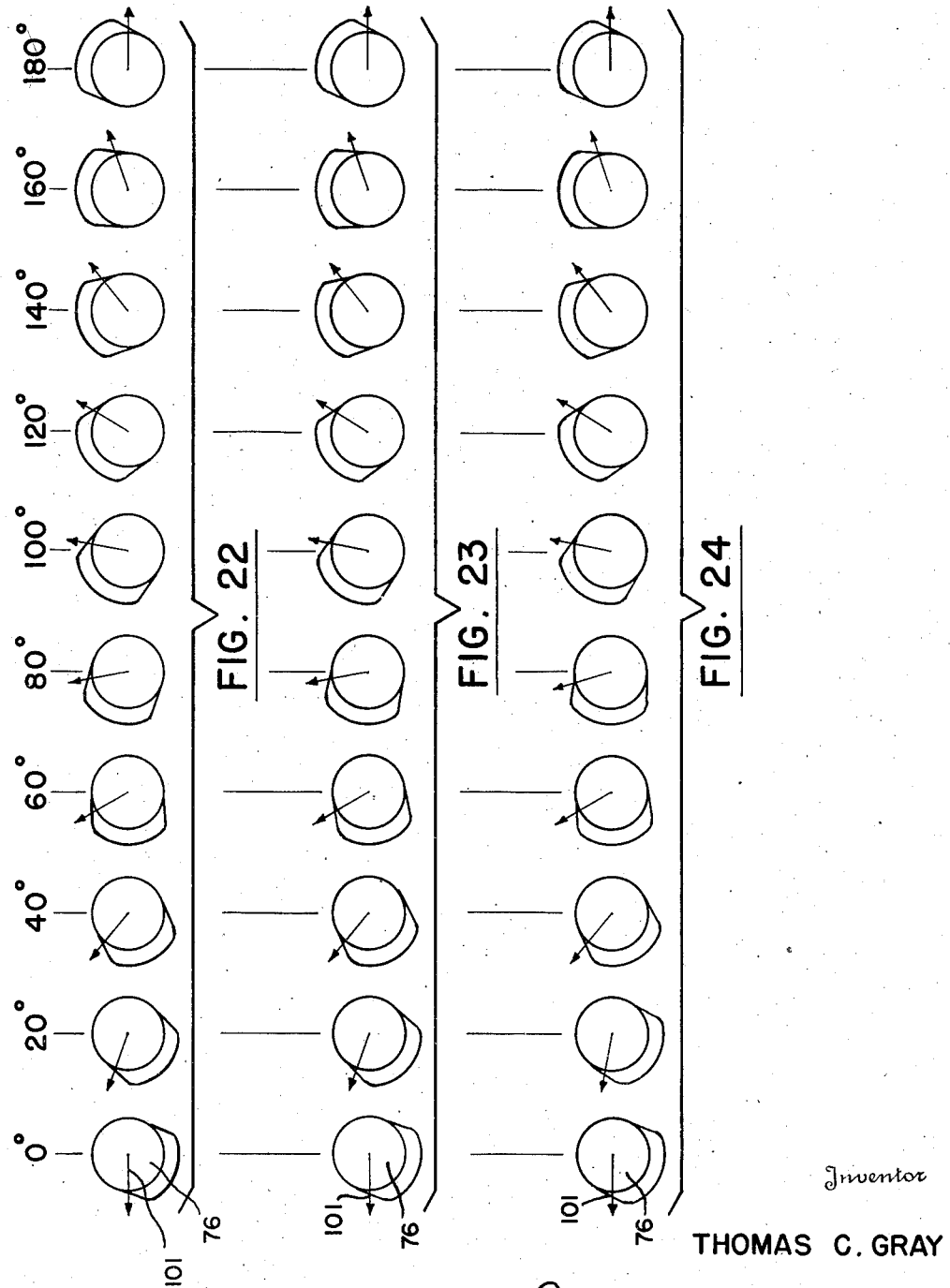
Inventor
THOMAS C. GRAY
By Ralph L Chappell
Attorney Patented Apr. 27, 1948

2,440,259

UNITED STATES PATENT OFFICE 2,440,259

CAM ACTUATED VALVE MECHANISM FOR FLUID PRESSURE ENGINES

Thomas C. Gray, United States Navy

Application March 9, 1945, Serial No. 581,818

14 Claims. (Cl. 121—167)

(Granted under the act of March 3, 1883, as amended April 30, 1928; 370 O. G. 757)

This invention relates to fluid engines and more particularly to new and improved variable event valve actuating mechanism therefor.

In order to meet the ever-increasing demands imposed upon steam engines in the matter of speed, load, increasing thermal efficiency, increased cylinder efficiency (economy and power) and the like there have been proposed numerous fluid distribution valve control mechanisms whereby the opening and closing events of the valve operation could be varied. It is well known in the art that there exists for each engine operating condition of speed and load a preferred timed valve cycle which permits the achievement of the maximum in performance or economy for the particular task at hand.

It is recognized that there have been proposed various means whereby valve events could be varied within certain limits, however, such constructions have inherent limitations in operation, construction and design which keep them from achieving practical efficiency and control.

The present invention contemplates the provision of improved valve actuating means which will permit a variable and selective period between the opening and closing events of the steam admission and of the exhaust valves and yet retains a full and prompt tappet lift action which greatly increases the overall efficiency of the engine. Also, the engine operator can select the proper admission and exhaust valve events to obtain the desired optimum performance characteristics.

In the cycle of operation of a steam engine, the inlet valve normally opens shortly before the piston reaches dead-center at one end of the cylinder and steam at full reservoir pressure then enters the cylinder, moving the piston toward the opposite end until, at the point of cut-off, the inlet valve is closed. Thereafter the energy imparted to the piston is due to the expansive quality of the steam which is utilized until the exhaust valve opens at the point of release. This point is desirably kept constant at approximately 94% of the piston stroke. Steam is then exhausted through the exhaust valve on the return stroke of the piston until that valve closes and the compression portion of the stroke begins at the so-called point of compression which may vary as required from about 8 to 24% of the piston return stroke, depending on engine speed. Thereafter the sequential cycle of admission, cut-off, release and compression is repeated throughout engine operation.

It is obviously desirable that the valves open and close as nearly instantaneously as is kinetically possible whereby fluid flow resistance and wiredrawing may be minimized and the work or indicator diagram areas may be kept at a maximum.

At low speeds and during engine starting operations long cut-off periods are required in order to assure the necessary high starting torque, while at higher speeds the cut-off period may be shortened and economy gained by utilizing the expansive qualities of the steam.

Desirably, admission and cut-off are controlled by one inlet valve and release and compression by one exhaust valve both at one end of the cylinder. These valves are duplicated at the opposite end of the cylinder of a double acting steam engine and the valve operation at opposite ends of the cylinder are angularly timed approximately 180°.

Recent requirements in the line of motive power make advance in steam engine design essential. The recently developed steam turbine locomotive is representative of an engine capable of utilizing its boiler potential at all speeds. Water rates on this new engine appear high at low speeds with 50 lbs. per H. P. hour at 10 M. P. H. However the rates are very satisfactory as speed is increased. Existing steam flow/cylinder power/boiler potential ratios for reciprocating steam engines will have to be amply revised if they are to compete with the Diesel, steam turbine, and the new gas turbine. An important requisite is that steam distribution port areas must be proportioned so as to obtain a more worthwhile percentage of potential boiler power at the cylinders for speeds over 40 M. P. H.

It is an object of the present invention to provide a means for materially increasing the efficiency of reciprocating steam engines.

It is another object of the present invention to provide a practical means of obtaining controlled steam event cycles and insuring maximum thermodynamic efficiency and greatly improved performance in fluid expansion engines.

Another object is to provide new and improved means whereby maximum valve lift and consequently maximum steam flow may be assured in a variable cut-off fluid expansion engine at all settings of cut-off adjustment and available potential steam power may be utilized.

Still another object of the present invention is to provide a simple valve gear mechanism which is accessible and is of the package or unit replacement type whereby, in servicing, the variable valve control mechanism may bodily be removed by inexperienced personnel and may be easily replaced with a standby unit whereby the period during which the engine is idle for servicing may be reduced to a minimum.

An additional object of the present invention is to provide a control mechanism for fluid expansion engines which is easy to adjust and inspect and embodying adjustable remote controls which permit micromatic adjustment of engine cut-off and valve opening events during engine operation.

Other objects and advantages will be apparent from further consideration of the specification and appended drawings in which:

Fig. 10 is a schematic drawing of the valve actuating mechanism of the present invention;

Fig. 11 is an end elevation taken along a line substantially corresponding to line 11—11 of Fig. 10 and showing the relative location of the cams on the shaft with the engine on dead center;

Fig. 15 is a graph showing the inlet port opening area plotted against the main crank rotation;

Fig. 16 is a graph similar to the graph shown in Fig. 15 showing the inlet port opening area in relation to the area obtainable with a piston type valve operated by a conventional radial type valve actuating gear;

Fig. 17 is a sequential series of changed position views taken in 20° increments illustrating the inlet cam lobe positions through one piston stroke, when the cam is being accelerated or is leading;

Fig. 18 is a series of views similar to Fig. 17, but showing the inlet cam lobe positions when no acceleration or deceleration is imposed upon the cam;

Fig. 19 is a series of views similar to Fig. 17 showing the inlet cam lobe positions when the cam is being decelerated or is trailing;

Fig. 20 is a graph showing the exhaust port opening area obtained with the present invention compared with the area obtained by use of a prior art mechanism;

Fig. 22 is a sequential series of changed position views taken in 20° increments illustrating the exhaust cam lobe positions through one piston stroke when the cam is being accelerated or is leading;

Fig. 23 is a view similar to Fig. 22 showing the exhaust cam lobe positions when no acceleration or deceleration is imposed upon the cam;

Fig. 24 is a view similar to Fig. 22 showing the exhaust cam lobe positions when the cam is being decelerated or is trailing.

Principle of operation

Figure 1:
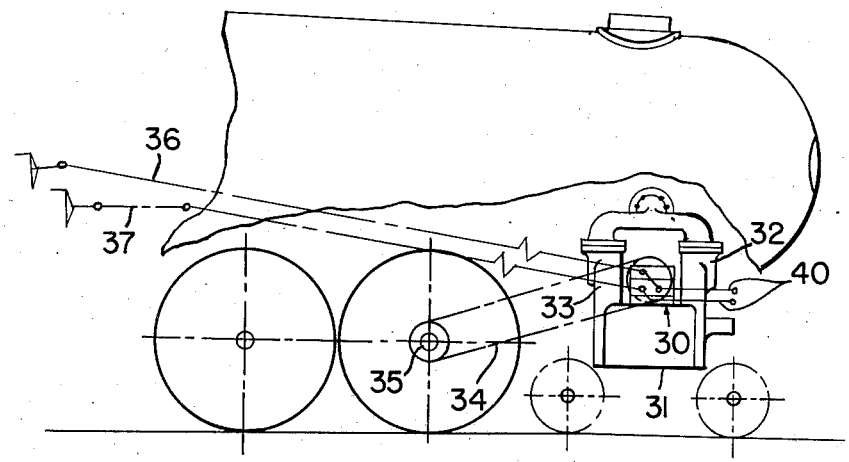
Fig. 1 is a schematic side elevation partially broken away of a steam locomotive embodying the control box of the present invention.

The valve gear constructed in accordance with the present invention and illustrated in the embodiment herein shown employs rotary cams which engage valve tappets and thereby may operate poppet type valves for regulating the steam admission to, and exhaust from a steam engine of the reciprocating type. It will be obvious that the degree of valve lift and consequently the control of the steam inlet and exhaust cycle is a function of the fixed cam contour which is a physical limitation built into the cam and cannot be modified during use.

Heretofore the limitations imposed by fixed cam contours have been appreciated and various attempts have been made to overcome the bounds of such limitations by many diverse mechanisms whereby the cam rotates in its usual sense and a variable cam effect is obtained. Some of the proposed mechanisms of the above indicated character are as follows:

*Variable profile cam drives.*—This type of drive requires a point contact between a cam roller and the cam which causes obvious operational difficulty. Furthermore, such a construction requires lateral shifting movement of the cam or of the cam roller which is impractical to achieve without obvious mechanical difficulties arising.

*Step type cam drives.*—The selection of cam contours is obviously limited with this arrangement and the lateral movement and resultant thrust of the cam shaft provides objectionable design and operational problems.

*Two cam parallel shaft drives.*—This type of drive employs two parallel cam shafts having the same rotation acting upon the opposite ends of a connecting beam type tappet member. With this arrangement port opening is sacrificed as the cutoff is shortened.

*Link and eccentric mechanisms.*—With this arrangement is is not possible to obtain the desired steam distribution nor is it possible to obtain dynamic valve action or near required valve openings. In addition, inherent angularities of motion greatly influence the design and operation.

It is obviously very desirable that the opening and the closure of the steam distributing valves be as near instantaneous as is physically and kinetically possible; that inlet and exhaust passages be such that fluid flow resistance and wiredrawing are minimized and that work or indicator diagram areas be kept at a maximum. For economical performance, it is mandatory that the engine utilize the maximum expansive phenomenon of the steam, thus requiring early cutoff and late release. Steam engine power output varies directly with the cylinder mean effective pressure and rotational speed. With low speeds and at starting, long cutoffs are required to assure the necessary high torques, while at higher speeds the cutoffs may be shortened and advantage taken of the expansive qualities of the steam. Briefly, the events should be desirably controllable approximately as follows:

1. *Admission.*—Variable—with zero at starting to a maximum at high speed.
2. *Cutoff.*—Varying widely and decreasing from about 75% to about 10% of the piston stroke as the speed of the engine is increased.
3. *Release.*—Desirably constant at approximately the end of the piston stroke.
4. *Compression.*—Varying from approximately 8% at starting to about 24% of the piston stroke at high speed.

The conventional radial type valve gears utilize one single valve for the control of all four events at both ends of the same cylinder with consequent sacrifices in power and economy due to the unavoidable distortion of valve events in the shorter cutoff range. These single valves are of the well known slide valve type used on earlier steam engines, and of the piston valve type found on a great majority of later and present day engines. These mechanisms and valves are greatly handicapped by having to control all events with one valve, with the result that many events are misplaced and the available port opening areas are far from desired, especially when the shorter cutoffs are used. For example, when the conventional steam locomotive valve gear is adjusted to allow a 20% cutoff, the steam is released at near mid-piston stroke instead of near the end of the working stroke. Obviously, an appreciable amount of the potential useful work is wasted in the exhaust. Also, port opening areas at the shorter cutoffs are such that it is impossible to utilize a substantial portion of the boiler potential. Attention is directed to the early "drooping" in the power-speed curves of the conventional steam reciprocating locomotive—around 55–60 M. P. H.—reflecting the inability of the engine cylinders to utilize the available steam. With the conventional systems, port openings are in effect decreased proportionately as piston speeds are increased. When dropping from approximately 50% cutoff to 25% cutoff, the effect on the steam flow is as if the port openings have been approximately halved with conventional valve gears. The valve gear of the present invention will allow full port opening area irrespective of cutoff selection.

In the present invention in order to achieve a variable valve control it is not proposed to modify the cam contour nor to employ a variable movement transmitting mechanism between the cam contour and the valve to be operated but, instead, there is added to the usual uniform rotary motion of the valve actuating cam an oscillatory cycle of acceleration and deceleration operating in timed sequence with the uniform circular motion of the cam drive whereby during certain portions of the period of contact of certain lobes with the valve tappet the cams may be either delayed or accelerated in their rotary action as desired so as to accelerate or decelerate the opening and closing of the valve.

The present invention further employs means comprising a shaft uniformly rotating said cam but adapted for reciprocation whereby through suitable splines the uniform rotary motion may be changed to a nonuniform rotating motion in accordance with empirically predetermined valve events.

This invention also provides drive means for said rotary motion and said reciprocatory shaft movement which are interconnected by an adjustable or variable link arrangement to permit alteration during operation of the timed valve event sequence as above set forth.

Construction

Referring to the drawings in detail, the present invention is shown applied to a steam reciprocating locomotive where it serves to control the sequence of steam inlet and exhaust to and from the drive cylinders thereof. However, it will be apparent that this invention may as readily be applied to any other steam or fluid operated mechanism where maximum control of fluid flow is desired. As shown, the control box comprises a valve operating unit 30 which may be mounted upon the top of a main cylinder 31 between the forward steam chest 32 and the after steam chest 33. The operating mechanism within the control box may be driven by any suitable means as by a drive chain 34 operated in timed relation to the movement of the steam piston through suitable connection to one of the locomotive axles 35.

In order to provide the desired control, an event control rod 36 extends from the valve control unit to a suitable operating means which may be located in the cab of the locomotive.

Figure 2:
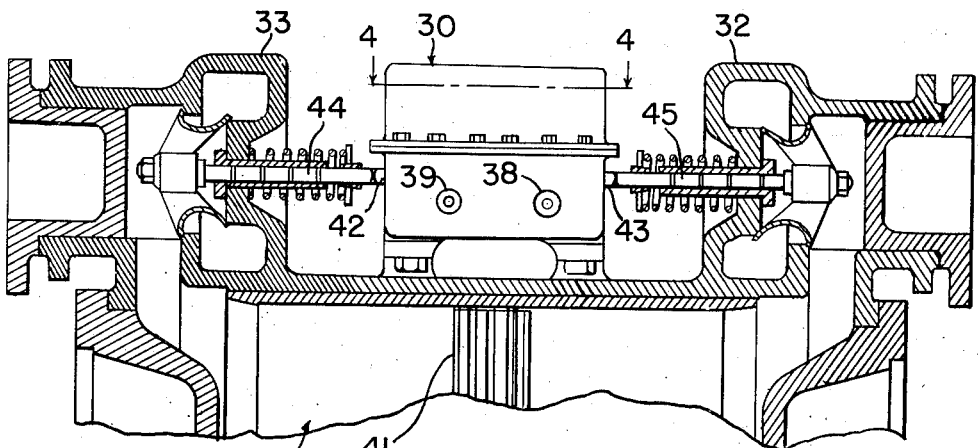
Fig. 2 is an enlarged detailed side elevation partially broken away of a portion of the embodiment illustrated in Fig. 1.

As shown in Fig. 2, the unit 30 may comprise upper and lower halves secured together at their marginal portions and having an event control connection 38 to which event control rod 36 is secured, and a reverse connection 39 to which the reverse control rod 37 is secured for operation. These controls may be of any desired character adapted to operate at a considerable distance as is well known in the art.

If desired, extensions 40 from each of the control rods 36 and 37 may pass to the opposite side of the locomotive and be so arranged as to also control a similar unit on the opposite side of the locomotive. Any desired linkage may be used for this purpose. Separate linkages may be provided to the locomotive cab if desired.

With the unit 30 mounted on top of the main cylinder 31 within which a piston 41 reciprocates, the unit is so disposed that outwardly extending inlet valve tappets 42 and 43 will register in axial alignment with inlet valves 44 and 45. As shown particularly in Fig. 3, exhaust valves 46 and 47 may be disposed behind the inlet valves, and the control box 30 operates both the inlet and the exhaust valves for both ends of the double acting steam cylinder. Exhaust valves 46 and 47 are operated by means of exhaust tappets 48 and 49.

Figure 3:
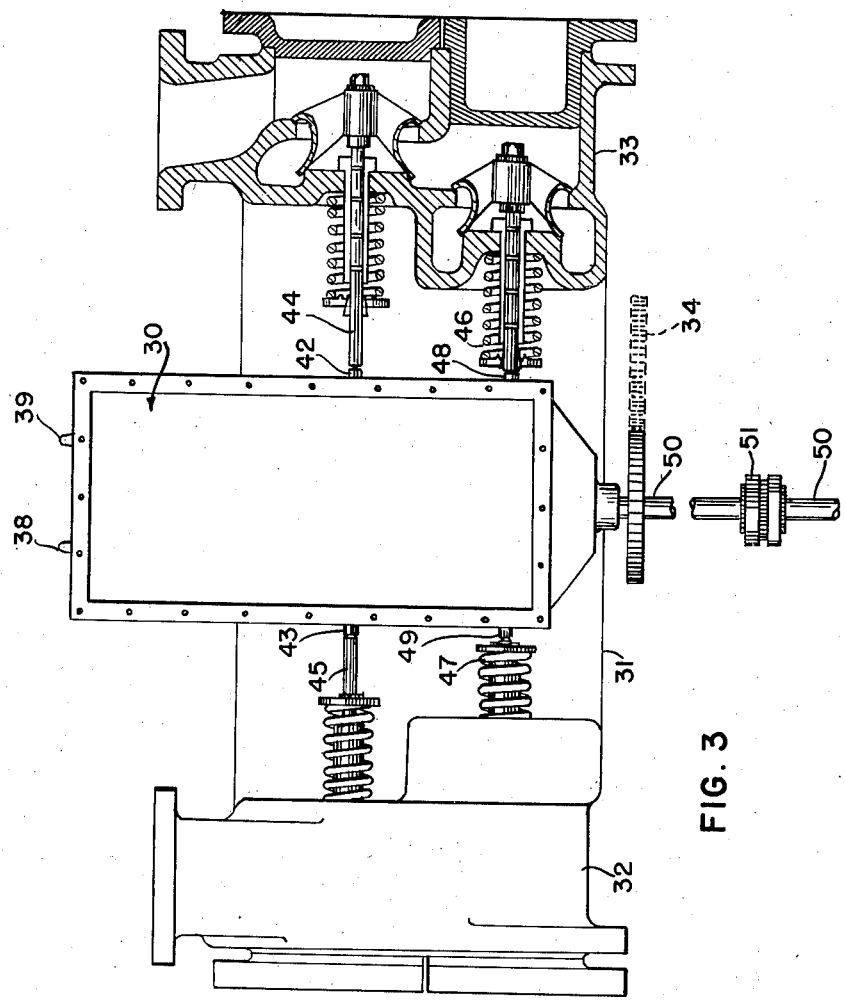
Fig. 3 is a top plan view of the control box and associated valves illustrated in Fig. 2.

Fig. 3 also shows the drive mechanism which may include a drive chain 34 driving shaft 50 extending into the control box 30. An extension of the shaft 50 through a suitable coupling 51 reaches to the cylinder on the opposite side of the locomotive, to drive another valve operating unit identical with unit 30.

Figure 4:
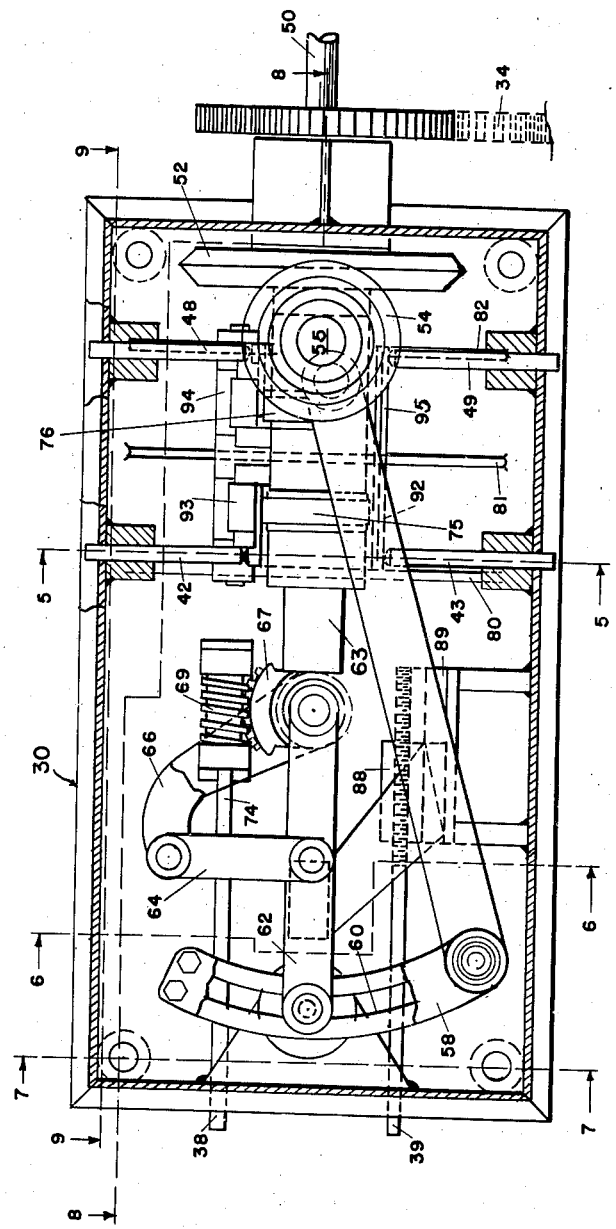
Fig. 4 is an interior plan view taken on a line substantially corresponding to lines 4—4 of Figs. 2 and 8, showing the adjustable valve event control mechanism within the control box.
Figure 6:
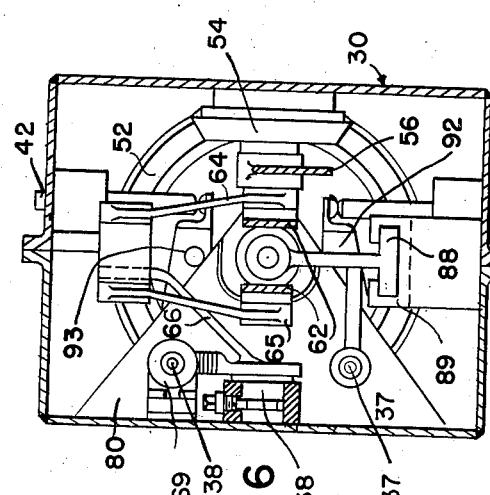
Fig. 6 is a view similar to Fig. 5 taken along a line substantially corresponding to line 6—6 of Figs. 4 and 8.
Figure 7:
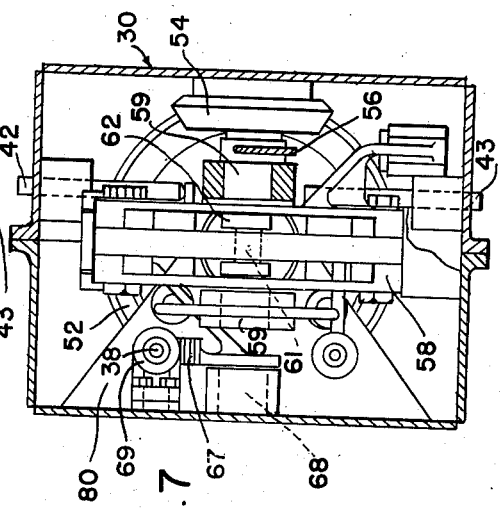
Fig. 7 is a view similar to Fig. 5 taken along a line substantially corresponding to line 7—7 of Fig. 4.
Figure 5:
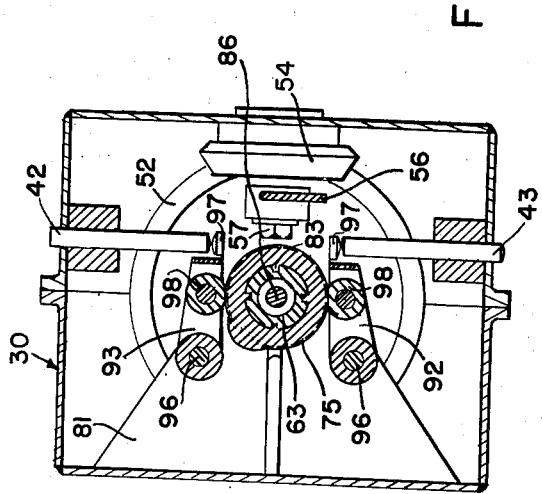
Fig. 5 is a transverse cross-sectional view taken along a line substantially corresponding to line 5—5 of Fig. 4.

Referring to the disclosure of Figs. 4 to 8 inclusive, Fig. 4 shows the interior of the control box 30 as it appears when viewed along a line substantially corresponding to line 4—4 of Fig. 3 wherein the drive shaft 50 is shown connected to and directly rotating a drive gear 52 as by means of hub extension 53 thereon. Gear 52 meshes with and drives a smaller crank gear 54 which may be journalled on a stub shaft 55 extending inwardly from the control box wall and has a crank rod 56 driven by an inwardly extending crank pin 57 thereon. Rotation of drive shaft 50 and drive gear 52 therefor rotates the small crank gear 54 and reciprocates crank rod 56.

The far end of crank rod 56 is connected to the offset lower end of an arcuate link 58. This arcuate link 58 is journalled centrally upon a suitable link trunnion 59 so that reciprocating movement of the crank rod 56 causes the arcuate link 58 to oscillate about its center 59. As shown, a 2-to-1 gear ratio exists between drive gear 52 and crank gear 54 so that for each revolution of gear 52 the arcuate link 58 is oscillated to and fro twice.

The arcuate slot 60 in the link 58 may receive a link block 61 which is slideably adjustable along the slot. To this link block is secured a radius rod 62 which may be supported intermediate its ends by a hanger arm 64 and the opposite end of the radius rod is journaled to an axially reciprocable cam sleeve 63.

In order to change the amount of axial reciprocation of the cam sleeve 63 for each revolution of drive gear 52, the link block 61 may be adjusted up and down in the arcuate slot 60 to positions above or below its center of oscillation. It will readily be apparent that the length of stroke of the radius rod 62 will increase as the link block moves farther away from the center of oscillation.

In order to raise and lower the radius rod 62, spaced hanger arms 64 and 65 are provided and depend from a hanger arm support 66. The latter has a sector portion 67 disposed adjacent its bearing 68 and the arms may be adjusted by means of a self-locking worm gear 69 which engages the sector 67 and may be operated by event control shaft 38. It is apparent that rotation of the shaft 38 raises and lowers radius rod 62 with a consequent change in the axial reciprocatory motion imparted to cam sleeve 63.

Figure 8:
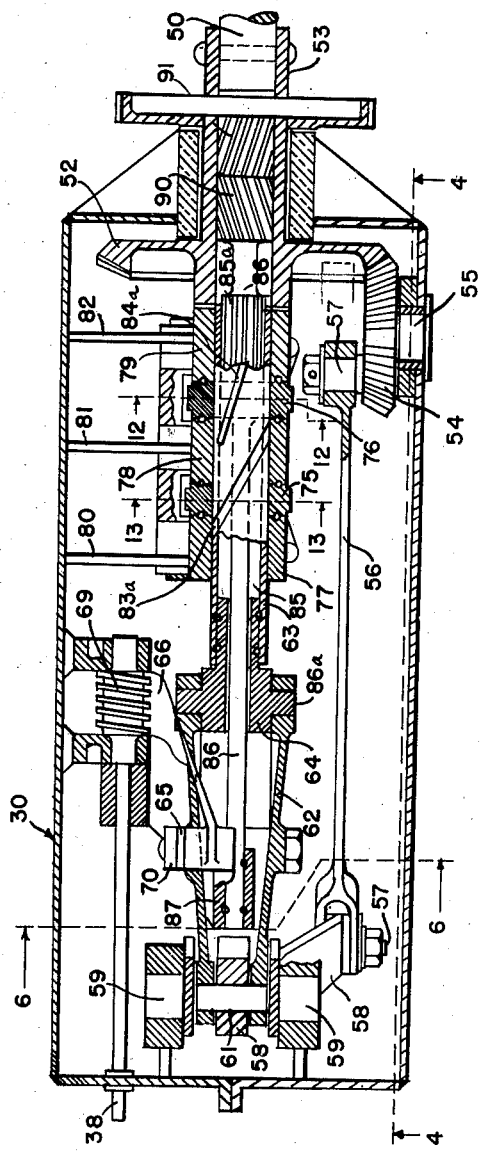
Fig. 8 is a vertical sectional view taken along a line substantially corresponding to line 8—8 of Fig. 4.
Figure 9:
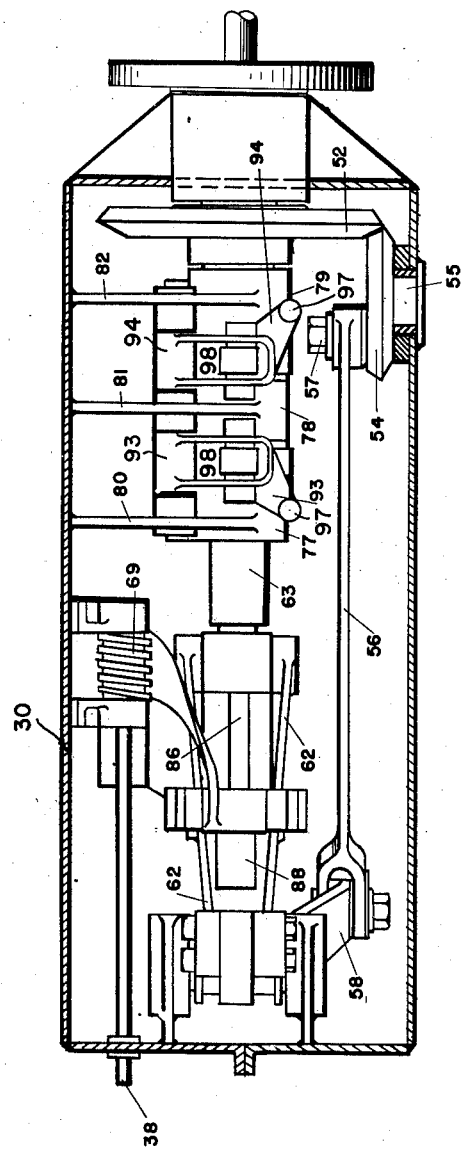
Fig. 9 is a side elevation similar to Fig. 8 taken along a line substantially corresponding to line 9—9 of Fig. 4.
Figure 12:
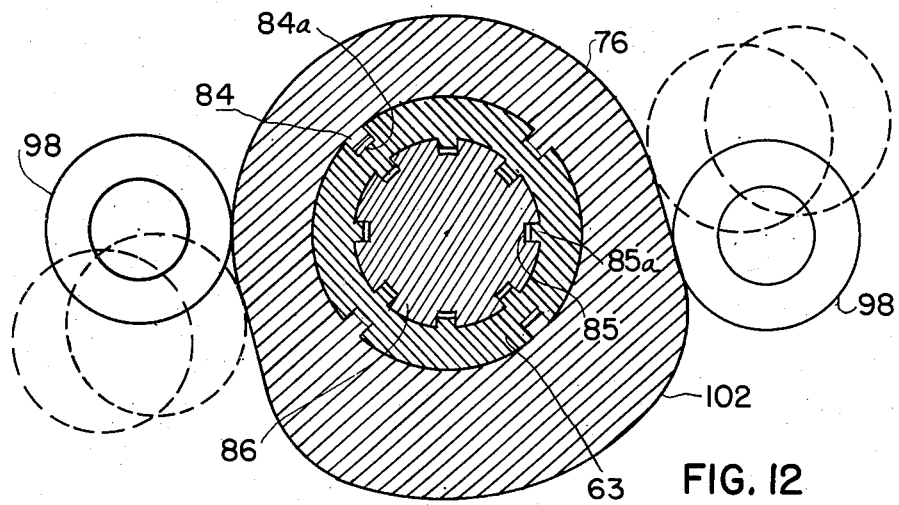
Fig. 12 is a transverse sectional view of the exhaust cam taken along a line substantially corresponding to line 12—12 of Fig. 8.
Figure 13:
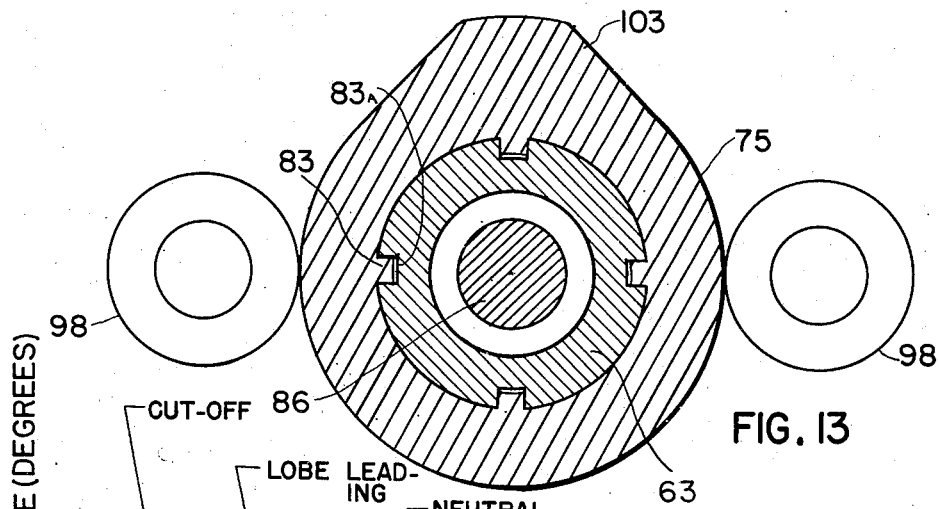
Fig. 13 is a transverse sectional view of the inlet cam taken along a line substantially corresponding to line 13—13 of Fig. 8.

The cams for operating the valve tappets may be mounted on the cam sleeve 63 in the manner best shown in Fig. 8 wherein an inlet cam 75 and an exhaust cam 76 are mounted between cam sleeve journals 77, 78 and 79 which are supported from brackets 80, 81 and 82 extending from the side wall of the control box enclosure. These journals obviously prevent all but rotary movement of the cams. In order to rotate cams 75 and 76 they may be provided with cam keys 83 and 84 respectively extending into cam slots 83a and 84a of the cam sleeve 63. The keys 83 on the inlet cam 75 register with the slots 83a and the keys 84 on the exhaust cam 76 registering with the slots 84a. This is best illustrated in Figs. 12 and 13 of the drawings.

Cam sleeve 63 may be internally hollow and provided with straight grooves 85 to receive the straight splines 85a on a centrally extending axially movable reverse shaft 86 which is connected to the radius rod fulcrum block 86a and has a thrust journal 87 at its far end. As shown in Fig. 4, this journal is connected to a movable thrust block 88 which is supported in suitable ways 89 and may be moved back and forth by means of the reverse control rod 37.

The opposite end of reverse shaft 86 is provided with helical splines 90 which engage within corresponding mating helical grooves 91 within the bore of the drive gear 52. From the above construction it will be apparent that rotation of drive gear 52 through reverse shaft 86 rotates cam sleeve 63 and the cams thereon. Reverse shaft 86 is kept from axial movement by the thrust journal 87 and may be adjusted by thrust block 88. The cam sleeve 63 will reciprocate in a manner varying with the location of the link block 61 above or below the center of oscillation of the arcuate link 58. This shaft reciprocates back and forth twice for each rotation of the inlet and exhaust cams.

In order to transmit the motion caused by the cam contours to the valve actuating push rods or tappets, suitable cam follower arms 92, 93, 94 and 95 may be provided which are pivoted at one end to a supporting bracket 96 extending from the control box wall. At the opposite end these arms are provided with tappet engaging bosses 97, which bear against the inner ends of the valve tappets. Cam follower rollers 98 are mounted within an opening in each of these arms and bear against the adjacent cam surface.

Fig. 10 shows schematically the operation of the valve event control mechanism employed in the present invention. As there indicated, rotation of the drive gear 52 which meshes with the crank gear 54 in a two to one gear ratio causes reciprocation of the crank rod 56 and oscillation of the arcuate link 58 about its centrally disposed trunnions 59. In this view the link is shown schematically by a curved line 58a connected to the end of the reciprocating crank rod 56. This line 58a has nine stations numbered at intervals to indicate relative points to which the link block 61 may be adjusted as desired. Of course, the selection and numbering of these stations is merely for the purpose of reference and the link block may be positioned at any desired intermediate position.

Assuming for the moment that the link block 61 is in position No. 9 at the lowermost portion of the arcuate slot 60 in the link 58 and starting from the position shown in Fig. 10 with the crank gear 54 rotating clockwise, the crank rod 56 and the lower end of the associated link 58 will be drawn to the right and, by means of radius rod 62 the cam sleeve will be moved to the right through a lobe trailing path 99. Since the inlet and exhaust cams have uniform circular motion at dead center position as defined by the drive gear 52, movement of the cam sleeve 63 to the right with the helical splines of the character shown will obviously cause cam rotational delay and will retard the rotative motion of the cam.

It will be obvious that continued rotation of the crank gear 54 more than 180° of its rotation (90° of the rotation of drive gear 52) will move the crank rod 56 back to the left moving with it the lower end of link 58 and the radius rod 62. This returns the cam sleeve again to its starting position and the cams associated with the sleeve are therefore correspondingly accelerated and returned to their initial position with respect to the drive gear 52.

By the above arrangement there has been added to the uniform rotary motion of the cams a non-uniform decelerating and an accelerating movement which occurs in timed relationship to the uniform rotary motion of the cams. It will be evident that at any intermediate station along link 58 such as 8, 7 or 6 a similar phenomena will occur though in less degree.

The non-uniform deceleration and acceleration just described with reference to a trailing action of the cam lobe may be provided in the opposite form by moving the link block 61 to any station above the center of the link 58, such as station 1. With this arrangement rotation of the crank gear 54 clockwise causes movement to the right of the lower part of the crank rod 56 and a corresponding movement to the left of the upper portion of the link 58. This draws the radius rod 62 to the left moving the cam sleeve 63 into a lobe leading position 100 so that to the uniform rotary movement of the cams there is imparted an additional non-uniform acceleration during a portion of the rotation of these cams and consequent corresponding deceleration during the remainder of that rotation.

Figs. 17, 18 and 19 illustrate the relative rotation of the cam in its acceleration and deceleration through a period of 180° with relation to the uniform rotary motion of the drive gear 52. In Fig. 17 inlet cam 75 with its characteristically short lobe is shown in schematic outline in the changed positions occupied at 20° increments during 180° of crank rotation. The arrow 101 in each of these figures shows the normal uniform rotary motion of the drive gear 54. Fig. 17 shows the inlet cam leading the uniform rotary motion. Fig. 18 shows the inlet cam coinciding with the uniform rotary motion while Fig. 19 shows the inlet cam trailing the uniform rotary motion.

Figs. 22, 23 and 24 illustrate the exhaust cam in similar changed position form, though it will be noted that the magnitude of the leading and trailing action is normally less.

It will be obvious that the amount and degree of acceleration and deceleration varies and is a function of the angle of the helical cam slots 83a and 84a to which the cams are keyed. Thus the inlet cam 75 will normally have a helical spline with a degree of lead considerably in excess of the helical spline which controls the advancing and retarding of the exhaust valve cam 76. Likewise such grooves instead of being uniform straight line helices may be in the form of helices with a gradually increasing angle of attack so that during certain portions of the movement of the cam sleeve 63 the amount of cam advance or retard may be accordingly varied. This is a matter of design.

An additional important feature of the present invention is the provision of accurate means whereby a micromatic adjustment of the degree of cam lead may be achieved. This adjustment includes the reverse mechanism comprising reverse shaft 86 and its operating parts which are adjusted by the reverse control rod 37.

As shown the reverse shaft 86 transmits the uniform rotary drive motion from drive gear 52 to the axially slidable multiple splined cam sleeve 63. The straight grooves 85 merely serve to transmit rotary motion from the shaft 86 to the cam sleeve 63 without changing the uniformity of the rotation. However, the helical splines 90 on the far end of the shaft, by engagement within the corresponding and mating helical grooves 91 inside of the drive gear 52 may, by axial movement of the shaft, cause the cam sleeve to rotate and to carry with it in its exact rotation, the inlet and exhaust cams. The amount of rotation of the reverse shaft 86 is a function of the lead angle of the splines and grooves 90 and 91.

It will be further apparent that the above indicated reverse means may also be employed to vary the degree of lead which is employed. This is indicated in Fig. 10 where as shown, a zero lead may be employed for greatest tractive effort in starting the locomotive and, as speed is increased, the amount of lead may be increased so as to increase the amount of preadmission thereby properly cushioning the inertia effects of the moving parts.

It will be apparent from the above construction that movement of the reverse control lever from the "forward" position in Fig. 10 to the "reverse" position will result in a substantial rotation of the cam sleeves and both cams mounted thereon so that the cams are in a position to control reverse motion of the engine. The amount of movement required to accomplish this is, of course, a function of the lead angle of the reverse shaft helices.

In Figs. 12 and 13 are shown representative cam contours which may be employed in the present invention. As there indicated the exhaust cam 76 in Fig. 12 has an elongated tappet engaging face 102 while the inlet cam 101 is provided with a tappet engaging face 103 of materially reduced area. The selected design of the cam faces will, of course, depend upon a number of variable factors which are to be considered in the present valve actuating mechanism.

Figure 14:
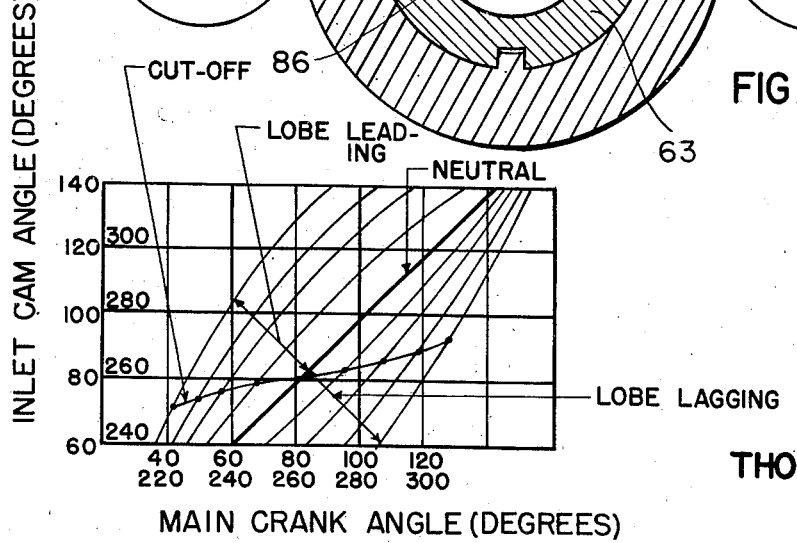
Fig. 14 is a graph showing the relative inlet cam angular movement plotted against the main crank rotation.

In Fig. 14 is shown graphically the relative inlet cam movement in terms of cam angle with relation to the crank angle of the reciprocating steam engine. Thus, in this view the nine representative positions above described are laid out and the amount of cam lead or cam lag incident thereto is illustrated.

In Fig. 15 is illustrated graphically the inlet port opening area in square inches per degree of steam engine crank angle and it will be noted that the area increases radically without an extensive amount of preadmission lead so that maximum steam flow is obtained with resultant increase in power, and a desirable power output/boiler potential ratio, can be realized.

In Fig. 16 the inlet port opening area is illustrated as compared to the conventional inlet port area plotted against the crank angle in degrees. The amount of preadmission heretofore required and consequent loss due to unnecessary piston retarding pressure thus obtained is readily apparent. Likewise, from this graph, it will be seen that the port opening area of the conventional engine varies with the amount of "cut-off" to which the valve mechanism is set. Thus, assuming the proposed device provides an inlet port opening area of 100%, cut-off curve No. 1 with the conventional engine permits an inlet port opening area of approximately 30.0% and requires a preadmission opening point in degrees of crank angle of approximately 330° while with a valve control unit constructed in accordance with the present invention a cut-off curve 1a at 12% cut-off permits a 100% opening of the inlet port and the valve need not start to open until about 343° of crank angle rotation. Similar improved performance will be noted by comparing cut-off curves 3 and 3a of the graph.

Fig. 20 is a similar graph for the exhaust valve and it will be noted that with the conventional exhaust valve operating mechanism and a cut-off of 12% curve No. 1 starts at a point between 75° and 80° of the main crank angle and stops at approximately 290° of the main crank angle. With the control mechanism of the present invention, increased expansion may be permitted and greater thermal efficiency obtained by not opening the exhaust valve in a 12% cut-off curve until approximately 135° of crank angle and the valve may then close at approximately 305° of crank angle. Similar efficient performance for other cut-off positions are indicated upon this graph.

Figure 21:
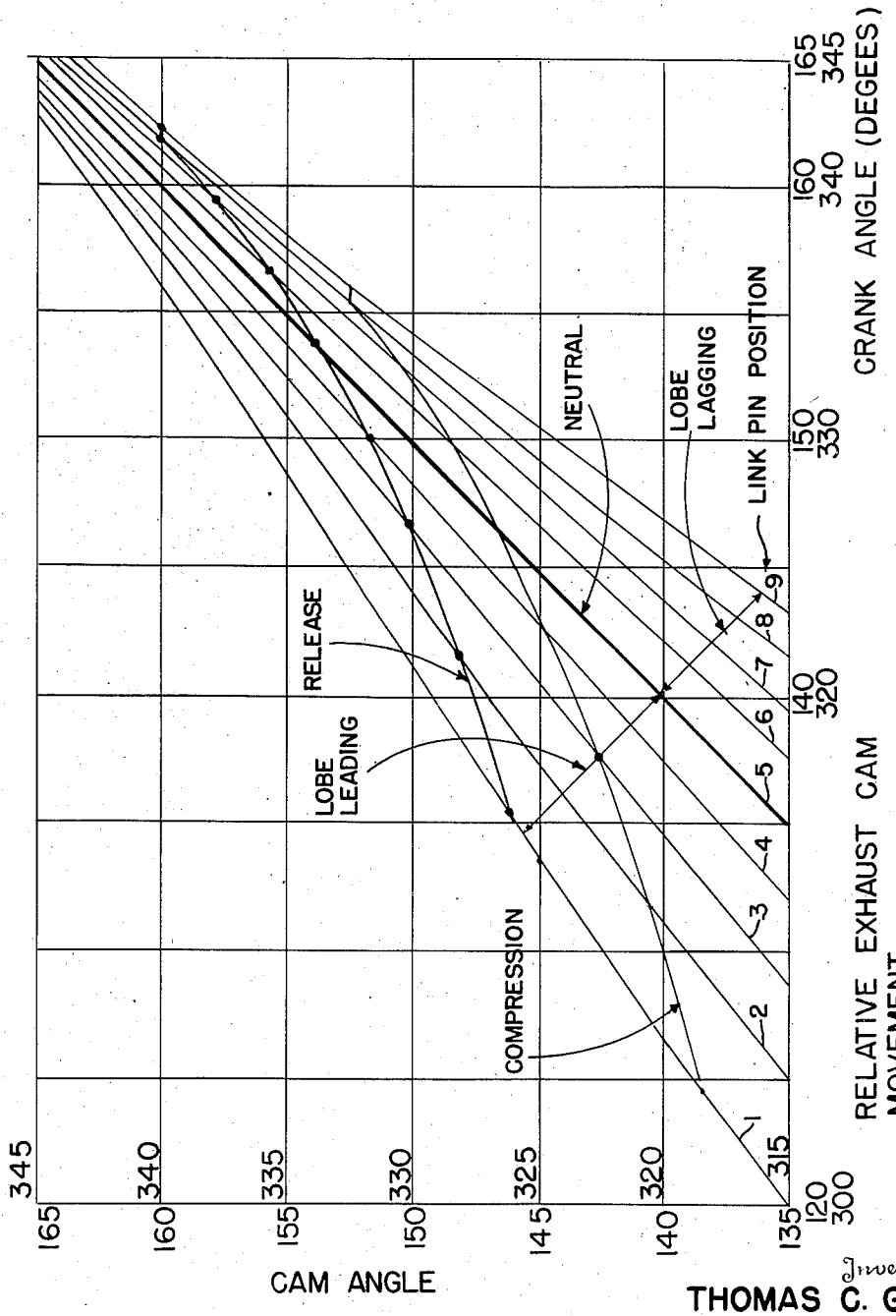
Fig. 21 is a graph showing the relative exhaust cam angular movement plotted against main crank rotation.

Fig. 21 is a view similar to Fig. 14 and shows the relative exhaust cam movement in a valve actuating device constructed in accordance with the present invention. As in Fig. 14 the relative stations to which the exhaust cam angles relate are numbered upon the chart.

Of course, the present invention is susceptible to modification in many particulars and the proportions indicated are given as merely representative of one embodiment that this invention may assume. To those skilled in the art it will be apparent that the operation of the device may be varied by modifications in the shapes of the inlet and exhaust cam contours, the shapes of the slots in the cam sleeve, the construction and shape of the link arm and other obvious proportions which may be changed at will to suit the requirements of the engine.

For purposes of illustration the operation of a valve control unit in accordance with the present invention may be shown in the following table, where the figures indicate the per cent of piston stroke where the following events take place:

| Cutoff | Preadmission | | Release | | Compression | |
|---|---|---|---|---|---|---|
| | Gray | Piston | Gray | Piston | Gray | Piston |
| Per cent | Per cent | Per cent | Per cent | Per cent | Per cent | Per cent |
| 10 | 2.5 | 10 | 85 | 42.9 | 22 | 42.9 |
| 15 | 2.0 | 6.2 | 89 | 50.4 | 17 | 35.8 |
| 20 | 1.0 | 4.4 | 91 | 55.7 | 14 | 31.0 |
| 25 | 1.0 | 3.4 | 93 | 60.3 | 11 | 27.3 |
| 35 | .5 | 2.1 | 95 | 67.8 | 9 | 21.1 |
| 50 | .4 | 1.2 | 96 | 76.8 | 7 | 14.6 |
| 60 | .3 | .74 | 97 | 82.1 | 6 | 11.0 |
| 70 | .2 | .60 | 98 | 87.1 | 5 | 7.8 |
| 80 | 0 | .40 | 99 | 91.6 | 3 | 4.9 |

The invention may be embodied in other specific forms without departing from the spirit or essential characteristics thereof. The present embodiments are therefor to be considered in all respects as illustrative and not restrictive, the scope of the invention being indicated by the appended claims rather than by the foregoing illustrative description, and all changes which come within the meaning and range of equivalency of the claims are therefore intended to be embraced therein.

The invention described herein may be manufactured and used by or for the Government of the United States of America for governmental purposes without the payment of any royalties thereon or therefor.

What is claimed is:

1. A fluid distribution control unit for actuating the valves of an elastic fluid engine comprising inlet and exhaust valve operating cams, engine driven means for imparting a timed rotary motion to said cams, and adjustable means including an axially movable sleeve for advancing and retarding the rotary motion of the cams during successive portions of their rotation.

2. A fluid distribution control unit for actuating the valves of an elastic fluid engine comprising inlet and exhaust valve operating cams, engine driven means for imparting a timed rotary motion to said cams, and adjustable means including an axially movable sleeve for advancing and retarding the rotary motion of the cams during certain periods of their cycle of rotation, the sleeve being separately connected to the inlet and exhaust valve operating cams by helical splines whereby the relative advancement and retarding of each during portions of the rotary cam cycle is a function of the angle of said helix.

3. In a fluid distribution control unit for actuating the valves of an elastic fluid engine, the combination of individual inlet and exhaust valve operating cams with means for imparting an irregular rotary motion to the cams comprising a rotatable and axially moveable cam supporting sleeve having independent helical splined connections for driving each of the cams, drive means for rotating said sleeve in accordance with the engine rotation, and means for imparting a timed axial reciprocation to the cam supporting sleeve whereby the cams are accelerated and decelerated during timed portions of their rotation.

4. A fluid distribution control unit for actuating the valves of an elastic fluid engine comprising a sleeve rotatably driven by said engine, individual inlet and exhaust valve operating cams mounted upon and rotated by the sleeve, independent helical splines of dissimilar angles connecting said cams to said sleeve for accelerating or retarding the cams in their rotation by axial movement of the sleeve in timed relation to the rotary movement whereby said cams are accelerated and decelerated with respect to the normal rotary movement of said sleeve.

5. A poppet valve cam motion control mechanism wherein a cam having approaching surfaces and receding surfaces is non-uniformly rotated to decelerate during said approach, hesitate at the peak of opening for a variable length of time, and accelerate during receding movement of the cam, comprising a cam supporting member, means for rotating said cam supporting member, a cam mounted on said cam supporting member, means for reciprocating said cam supporting member in timed relation to said rotation, and a helical spline and groove connection between the cam and the cam supporting member whereby the rotary motion is communicated directly to the cam and the reciprocating motion is transformed into rotary motion of said cam during timed periods of the cam rotation.

6. A poppet valve cam motion control mechanism wherein a cam having approaching surfaces and receding surfaces is non-uniformly rotated to accelerate during the cam approach, hesitate at the peak of valve opening and decelerate during the cam receding movement comprising a cam sleeve, means for rotating said cam sleeve, a cam mounted on said cam sleeve, means for reciprocating said cam sleeve in timed relation to said rotation, and a helical spline and groove connection between the cam and the cam sleeve whereby the rotary motion is communicated directly to the cam and the reciprocating motion is transformed into rotary motion of said cam during timed periods of the rotary movement, and reversing means for said control mechanism comprising externally operable means to bodily rotate the cam sleeve and cams thereon through substantially ½ of a complete revolution.

7. A fluid distribution control unit for actuating the valves of an elastic fluid engine comprising a support, a rotary drive gear mounted on the support and driven in timed relationship with the engine, a cam sleeve rotated by the drive gear, valve operating cams mounted upon the sleeve and secured against other than rotary movement, a helical splined drive between the cam sleeve and the cam, and means for reciprocating said sleeve during continued rotary movement thereof in timed relation to its rotation whereby the speed of rotation of the cams is varied in various portions of their rotary movement.

8. A fluid distribution control unit for actuating the valves of an elastic fluid engine comprising a housing, a rotary drive gear mounted within the housing and driven in timed relationship with the engine, a cam sleeve rotated by the drive gear, cams mounted upon the cam sleeve and secured against other than rotary movement, a helical splined drive between the cam sleeve and the cams, means for periodically reciprocating said sleeve during continued rotary movement thereof in timed relation to the rotation of the cams to impose an accelerated or decelerated rotary movement upon the cams, and adjustable means for changing the degree and rate of reciprocation.

9. A fluid distribution control unit for actuating the valves of an elastic fluid engine comprising a drive gear driven from the engine, a cam supporting member rotated by the drive gear, a crank rod reciprocated by movement of the drive gear, an arcuate link oscillated by the crank rod, a link block mounted on said arcuate link and moveable through the center of oscillation thereof, a radius rod connecting the link block to the cam supporting member to impart reciprocating motion thereto, cams mounted upon the cam supporting member, and a helical connection between the cam supporting member and the cams whereby rotary motion is imparted to the cams which motion is accelerated and retarded by reciprocation of the cam support member.

10. A fluid distribution control unit for actuating the valves of an elastic fluid engine, comprising a drive gear driven from the engine, a crank rod reciprocated by movement of the drive gear, an arcuate link oscillated by the crank rod, a link block mounted on the arcuate link and moveable along said arcuate link toward and away from the center of oscillation thereof, a radius rod connecting the link block to the cam supporting member to impart reciprocating motion thereto, cams mounted upon the cam supporting member, and a helical connection between the cam supporting member and the cams whereby rotary motion is imparted to the cams which motion is accelerated and retarded by axial reciprocation of the cam supporting member, and means for changing the degree of acceleration and retarding action comprising remotely controllable link block positioning means.

11. A fluid distribution control unit for actuating the valves of an elastic fluid engine comprising valve operating cams for opening and closing the engine inlet and outlet valves, engine driven means for rotating the cams including a cam supporting member, means for imparting a reciprocating movement to the cam supporting member in addition to the rotation thereof, a common drive means for said rotating and reciprocating means, and means for varying the amount of reciprocation of said cam-supporting member.

12. A fluid distribution control unit for actuating the valves of an elastic fluid engine comprising a cam supporting member having a helical groove therein, a valve actuating cam mounted upon the cam supporting member and secured against lateral displacement, drive means to rotate the cam supporting member, keying means on the cam engaging with the helical groove to rotate the cam upon axial movement of the cam supporting member, and means for reciprocating the cam supporting member during rotation and in timed relation to the rotation, whereby the speed of rotation of the cam is alternately accelerated and decelerated during successive portions of its rotation.

13. A fluid distribution control unit for actuating the valves of a fluid driven engine comprising a valve gear enclosing housing, valve gear within said housing including a rotary drive gear, transmission means connecting the drive gear to the engine for rotation thereby, valve operating cams mounted within the housing, a cam supporting member supporting the cams, transmission means for rotating the cam supporting member, transmission means for reciprocating the cam supporting member in timed relationship to its rotation, said cam supporting member being attached to said cams so as to rotate the cams with rotary movement of the cam supporting member, the cam attaching means imparting acceleration and deceleration to the cams upon axial reciprocation of the cam supporting member whereby a uniform rotary movement of the cams is modified by a harmonious sequence of accelerating and decelerating forces applied thereto.

14. A fluid distribution control unit for actuating the valves of a fluid engine comprising a cam supporting member, valve operating cams slidably mounted upon said cam-supporting member, means for rotating the cam-supporting member and the cams mounted thereon, means for imparting reciprocating movement to the cam supporting member, and a common drive for said rotating and reciprocating means.

THOMAS C. GRAY.

REFERENCES CITED

The following references are of record in the file of this patent:

UNITED STATES PATENTS

| Number | Name | Date |
| --- | --- | --- |
| 463,874 | Seymour | Nov. 24, 1891 |
| 1,157,227 | Kienzle | Oct. 19, 1915 |
| 1,527,456 | Woydt et al. | Feb. 24, 1925 |
| 1,549,712 | Caprotti | Aug. 11, 1925 |
| 1,954,982 | Bolla | Apr. 17, 1934 |

FOREIGN PATENTS

| Number | Country | Date |
| --- | --- | --- |
| 402,086 | Great Britain | Nov. 15, 1933 |